Patented June 16, 1942

2,286,260

UNITED STATES PATENT OFFICE 2,286,260

PACKING MATERIAL

Samuel C. Carter, Los Angeles, Calif.

No Drawing. Application October 18, 1940, Serial No. 361,744

5 Claims. (Cl. 260—41)

The invention relates to packing and relates more particularly to an improved packing composition or packing material useful in the various situations where it is desired to provide pressure tight seals and fluid tight seals. It is a general object of the invention to provide an inexpensive efficient and durable packing material which is substantially unaffected by most fluids and which is effective where high pressures are encountered.

Another object of this invention is to provide an improved partially metallic packing material or metal bearing packing material which is in a solid state and yet is capable of distortion and flow when subjected to compression forces to assure full effective sealing contact with angular, irregular and rough surfaces and to readily flow or move in the packing carrying ports, passages, grooves, etc., of the machine parts.

Another object of the invention is to provide a packing material of the character referred to which is flexible and resilient even when subjected to high actuating compression forces to maintain the sealing engagement under all working conditions and to compensate for wear, play and varying temperature conditions.

Another object of this invention is to provide a packing material of the character referred to capable of withstanding reasonably high temperatures and which is resistant to oils, lubricants, etc.

Another object of this invention is to provide a packing material of the character referred to embodying a soft sealing metal such as lead in flake form capable of movement or flow and adapted to conform to the machine parts and a highly effective flexible resilient carrying medium and sealing medium which is capable of flow when subjected to compression forces and which retains its resiliency and flexibility under practically all operating conditions to maintain the metal flakes in condition for sealing service.

The packing material of the present invention is capable of considerable variation in the materials and proportions employed to adapt it for use in different situations. In the following detailed description I will describe a typical embodiment of the invention, it being understood that the invention is not to be construed as limited or restricted to the specific details set forth.

The improved packing material of the invention may be said to comprise, generally, metal particles or flakes, a flexible resilient carrier for the metal flakes and plasticizing and stabilizing ingredients.

The metal employed is a relatively soft deformable metal such as lead, brass, copper, white metal, type metal, aluminum, or the like. The particular metal employed may depend upon the intended use and the fluids to be handled. In most cases, it has been found desirable to use lead as the metal ingredient of the packing. The metal packing ingredient, whether it be lead or other soft material, is preferably in the form of flattened particles, flakes or discs. I prefer to employ metal discs or flakes which are more or less regular and smooth so that they may flow, shift and work in the resilient compressible carrier. Further, I prefer to employ fine or small metal particles or flakes. In practice where lead forms the metal element I take fine bird shot of about thirty-two thousandths (.0032) of an inch in diameter and put this shot through rollers to form discs or flakes of between five and ten thousandths (.0005 and .0001) of an inch thick. The discs formed in this manner are quite regular and smooth so that they may readily shift and flow in the resilient base or carrier material of the packing. The metal particles or flakes, in addition to acting as an effective packing or sealing material, give the product body and strength of make it non-uniform in texture thus increasing the coefficient of friction of the material. While the proportion of the metal flakes may vary considerably I have found it desirable to employ about 66% by weight of the metal flakes.

The flexible resilient carrier material is an important element of the packing. The carrier suspends, supports and separates the soft metal flakes and is such that it permits flow and shifting of the flakes and conforming of the flakes to the machine parts. Further, the carrier material is of itself a very effective, dependable and durable packing material for sealing with the machine parts. In accordance with the invention the carrier employed is substantially unaffected by most fluids, is resistant to heat and resists the action of oils and lubricants. These features are of great importance and adapt the packing material for use in situations where other packings employing a resilient base quickly deteriorate.

The base or carrier material is a synthetic rubber composition, namely, chloroprene converted by polymerization into a rubber-like solid marketed and known to the various trades as neoprene. I employ cured neoprene and this rubber-like substance is used in a ground or divided state. I prefer to use the chloroprene rubber or neoprene in a finely divided state or flour. The chloroprene rubber or neoprene flour is plasticized by a non-drying oil and stabilized by a cement, as described below, to constitute a stable solid yet readily deformed partially plastic, compressible and resilient mass. The carrier remains resilient and flexible under high compression forces to maintain the metal particles or flakes in sealing cooperation with the machine parts and to allow distortion, flexing and flowing of the packing material. While the proportion of the flexible resilient carrier employed may be varied greatly I have found it practical to employ the carrier in the proportion of about 33⅓% by weight.

A suitable quantity of non-drying stable oil is used in the composition to render the material plastic and to act as a binder. The invention contemplates the use of any suitable or available non-drying oil. In practice I employ air blown castor oil as the plasticizing lubricating and binding element. In addition to the moistening and plasticizing oil I employ a suitable amount of cement to bind the chloroprene rubber flour and thus aid in maintaining the material in a plastic stable mass. The cement used is preferably the product known and marketed as neoprene cement, it being understood that other suitable cements of a similar nature may be used. The proportions of the oil and cement employed may vary somewhat but in most instances are quite small.

The following example of the relative proportions of the ingredients employed in the improved packing material is typical and while preferred for most uses of the packing is not to be construed as limiting or restricting the invention.

Example

| | Pounds |
|---|---|
| Flaked lead shot | 3 |
| Carrier (neoprene) | 1 |
| Non-drying oil (air blown castor oil) | 3 |
| Cement (neoprene cement) | 1½ |

In making or compounding the packing material the several ingredients are first thoroughly mixed together. Following the mixing operation the material is shaped or molded into bodies or units of the desired size and shape. The material may be molded into pencils or sticks of suitable length, into balls, gaskets, rings or other shapes, to condition it for the intended use or installation. The packing material shaped as desired or left in bulk form is baked or cured for about one hour at a temperature of about 220° Fahrenheit. This completes the treatment of the material. The result is a stable self-supporting packing unit or packing element capable of being easily handled, packaged, etc.

The packing material of the invention is practically impervious to and impenetrable by most fluids. The material is semi-plastic or partially plastic and remains plastic and resilient even when under very high compression forces. This adapts the material for use in valves and other devices where it is necessary to subject the packing to very high compression forces to prevent the leakage of fluids which are handled at high pressures or which are of a penetrating nature. The flexibility and resiliency of the material is important as it allows the material to readily conform to the machine parts with which it seals and causes the material to remain in full effective sealing engagement with the machine or device surfaces for very long periods in cases where the parts or the packing or both wear away as well as in cases where there is relative movement or play or a substantial variation in temperatures. The fluid handled by the device or excluded by the packing material cannot dislodge, loosen, or soften the material. The principal ingredients, namely, the lead and the chloroprene rubber carrier mass, are both impervious to, non-absorbent of and unaffected by practically all fluids making the material very durable and long wearing in installations where other sealing materials soon deteriorate or wash away.

The metal flakes distributed throughout the packing material are, of course, compressed or forced against the surfaces of the machine parts where the material contacts such surfaces and being formed of a soft deformable material readily conform to the machine surfaces to seal therewith. When the packing material is under very high actuating or compressing forces it acts as a metal gasket or sealing element having metal to metal contact with the machine surfaces and yet retains sufficient flexibility and resiliency to fully conform to such surfaces and to seal therewith. The non-uniform condition of the packing material persists even after long installation periods and under high compression forces so that the sealing action does not change. Further, where a body or mass of the packing material is installed in a valve, or the like, the packing body may be added to from time to time by merely inserting pellets or sticks of the material into the packing carrying space and subjecting the whole to the actuating compressing forces. The packing material thus added merges or bonds with the original body of packing so that a continuous non-uniform textured mass results. While the packing material is flexible and resilient and capable of limited flow under compression its co-efficient of friction is such that it will not flow back or retract when relieved of the compression forces. The packing material is inexpensive, easily handled, stable and long wearing.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A moldable heat and fluid resistant packing comprising polymerized chloroprene in a finely divided state, castor oil, chloroprene cement, and flattened soft metal shot in approximately the following relative proportions by weight:

| | |
|---|---|
| Polymerized chloroprene | pound 1 |
| Castor oil | ounces 3 |
| Chloroprene cement | do 1½ |
| Flattened soft metal shot | pounds 3 |

2. Packing material for use in bulk or in molded form comprising a conformable mass of cured finely divided polymerized chloroprene with a small amount of non-drying oil, small soft metal particles in the form of flattened shot distributed throughout said mass and neoprene cement for binding together the finely divided chloroprene, there being a greater quantity by weight of shot than there is chloroprene.

3. Packing material comprising essentially cured polymerized chloroprene flour and flattened lead shot intimately mixed together with a non-drying oil and a polychloroprene cement binding the chloroprene flour together to form a stable mass, there being more flattened lead shot by weight than chloroprene flour.

4. Packing material comprising an intimately mixed mass of cured polymerized chloroprene flour, flattened lead shot, castor oil, and a neoprene cement binder acting to hold the mass in molded form, the oil and cement being in minor quantities and there being more lead by weight than chloroprene flour.

5. Packing material comprising essentially cured polymerized chloroprene flour and flattened lead shot intimately mixed together with air blown castor oil and a polychloroprene cement, the oil acting as a plasticizer and the cement acting as a binder for the chloroprene flour, there being more flattened lead shot by weight than chloroprene flour.

SAMUEL C. CARTER.